United States Patent [19]

Boriani et al.

[11] Patent Number: 5,394,970
[45] Date of Patent: Mar. 7, 1995

[54] DEVICE FOR FEEDING PACKETS OF CIGARETTES TO A CARTONING MACHINE

[75] Inventors: Silvano Boriani, Bologna; Fiorenzo Draghetti, Medicina, both of Italy

[73] Assignee: G.D Societa' Per Azioni, Via Pomponia, Italy

[21] Appl. No.: 165,081

[22] Filed: Dec. 10, 1993

[30] Foreign Application Priority Data

Dec. 18, 1992 [IT] Italy .......................... BO92A0439 U

[51] Int. Cl.[6] ................................................ B65G 1/00
[52] U.S. Cl. .................................. 198/347.2; 198/431
[58] Field of Search ............... 198/347.1, 347.2, 418.7, 198/431

[56] References Cited

U.S. PATENT DOCUMENTS

| | | | |
|---|---|---|---|
| 3,122,229 | 2/1964 | Engleson et al. | 198/347.2 |
| 3,305,128 | 2/1967 | Dearsley | 198/347.2 X |
| 3,314,520 | 4/1967 | Molins | 198/347.2 |
| 3,782,523 | 1/1974 | Giatti | 198/347.2 |
| 3,972,407 | 8/1976 | Kushigian | 198/347.2 X |
| 4,056,200 | 11/1977 | Provost | 198/431 |
| 5,099,896 | 3/1992 | Ritola | 198/347.2 X |

FOREIGN PATENT DOCUMENTS 2239722  2/1972  Germany .......................... 198/347.2

*Primary Examiner*—James R. Bidwell
*Attorney, Agent, or Firm*—Marshall, O'Toole, Gerstein, Murray & Borun

[57] ABSTRACT

A device for supplying packets, in particular packets of cigarettes, wherein a conveyor feeds the packets successively and in steps into seats on a wheel by which the packets are transferred in steps to a cartoning machine for forming groups of "n" packets each; the packets being fed by the wheel through an exchange station where the wheel cooperates with a reintegrating store for supplying any empty seats with respective packets, and which is reloaded by receiving from the wheel the packets in a continuous sequence of "n" seats, so that the cartoning machine is fed with a gap which it absorbs by performing a no-load cycle.

6 Claims, 1 Drawing Sheet

DEVICE FOR FEEDING PACKETS OF CIGARETTES TO A CARTONING MACHINE

BACKGROUND OF THE INVENTION

The present invention relates to a device for feeding packets of cigarettes to a cartoning machine.

In particular, the present invention relates to a device of the aforementioned type capable of feeding packets of cigarettes to a cartoning machine designed to form the packets into cartons each containing a given "n" number of packets.

Products in general are fed from the manufacturing machine to a grouping machine using devices which provide for transferring the products between the two machines, as well as for a product reintegrating function.

Patents DE-PS 33 19 390 and DE-OS 37 05 941 relate to transfer devices supplied at the input with a possibly discontinuous succession of products (in this case, cigarettes) featuring random gaps produced by a reject device, and which provide at the output for feeding a grouping machine with a succession of products featuring gaps respectively equal to said "n" number of products. According to the above patents, each gap is absorbed by the grouping machine performing a no-load cycle as of any point in the cycle, with the disadvantage of possibly having to reject two incomplete groups at the start and end of the no-load cycle.

SUMMARY OF THE INVENTION

It is an object of the present invention to provide a feed device similar to the above known devices, but which is capable of feeding packets of cigarettes to a cartoning machine in such a manner that said gaps are synchronized with the cartoning machine, and may be absorbed by the cartoning machine performing a no-load cycle the start of which coincides with the start of the machine cycle.

It is a further object of the present invention to provide a packet feed device which is extremely straightforward in design and relatively cheap to produce as compared with known devices.

According to the present invention, there is provided a device for feeding packets of cigarettes to a cartoning machine designed to form the packets into groups of "n" packets each; the device comprising conveyor means having a number of seats for feeding a succession of packets to the cartoning machine, said succession possibly presenting gaps, and each packet being housed inside a respective said seat on the conveyor means; and reintegrating means associated with the conveyor means at an exchange station, for feeding the conveyor means with packets with which to reintegrate said gaps; characterized by the fact that it comprises phase detecting means for dividing the seats of said conveyor means into sequences of "n" seats in time with the cartoning machine; and transfer means for exchanging said packets between the conveyor means and the reintegrating means; said transfer means responding to signals emitted by the phase detecting means, for transferring to the reintegrating means all the packets fed by the same said sequence of "n" seats, so as to reload the reintegrating means and form, in said succession, a corresponding gap in time with the cartoning machine

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figures 1, 2:
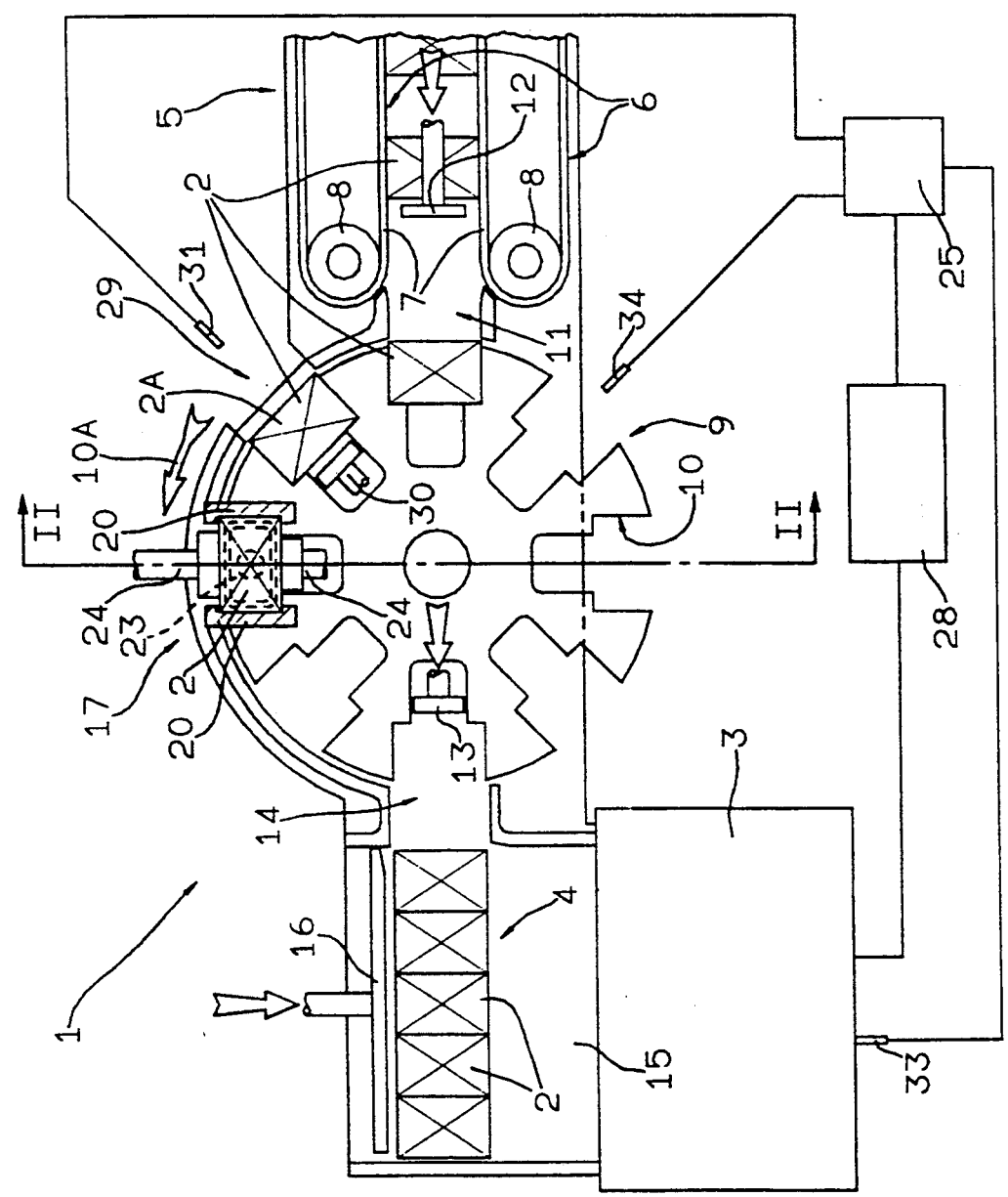
FIG. 1 shows a schematic plan view, partly in blocks, of a preferred embodiment of the device according to the present invention.
FIG. 2 shows a section along line II—II in FIG. 1.

Number 1 in the accompanying drawings indicates a device for feeding packets 2 of cigarettes from a manufacturing machine (not shown)—consisting in this case of a cellophaning machine—to a cartoning machine 3 designed to form packets 2 into groups 4 of "n" packets (in the example shown, "n" equals five).

Device 1 comprises an output conveyor 5 of said manufacturing machine (not shown), in turn comprising two parallel, side by side conveyor belts 6 separated by a distance equal to the longitudinal dimension of packet 2. Each conveyor 6 consists of a belt 7 looped about a pair of rollers 8 (only one shown) with their respective axes parallel to each other and perpendicular to the FIG. 1 plane.

Conveyor 5 cooperates with a transfer wheel 9 having its axis parallel to that of rollers 8, having a number of equally spaced peripheral radial seats 10, and rotated intermittently anticlockwise (in FIG. 1) by drive means (not shown).

Conveyor 5 is positioned radially in relation to wheel 9, and presents its output end tangent to the periphery of wheel 9 at a loading station 11 where a known pusher 12, moving back and forth in a direction parallel to the axis of conveyor 5, successively engages packets 2 so as to feed each into a respective seat 10 at each stop phase of wheel 9.

Inside respective seats 10, packets 2 are fed by wheel 9 in an orderly succession $2a$ and along a circular path $10a$ to an unloading station 14 where each packet 2 is engaged by a known pusher 13 and expelled from seat 10 radially in relation to wheel 9 and on to a surface 15 at the input of machine 3. On surface 15, packets 2 accumulate to define groups 4 of "n" packets 2 arranged side by side in a row located radially in relation to wheel 9 between the input of machine 3 and a pusher 16 which, moving back and forth in a direction parallel to surface 15 and perpendicular to the operating direction of pusher 13, provides for successively feeding groups 4 on to machine 3.

Path $10a$ extends through an exchange station 17 located between stations 11 and 14 and at which seats 10 are stopped successively facing a reintegrating store 18. Store 18 consists of a channel 19 defined by two opposite walls 20 and two opposite walls 21 perpendicular to one another, and having a cross section enabling it to house a stack consisting of at least "n" packets 2 and parallel to the axis of wheel 9. At station 17, each seat 10 is stopped between the input-output end 22 of channel 19 of store 18 and a pusher 23 movable through seat 10 in a direction parallel to the axis of channel 19.

In store 18, walls 21 terminate a given distance—generally greater than the thickness of packet 2—from end 22 of channel 19, and blend with the end plates of two opposed pressure elements 24 which, together with walls 20, define said end 22, and move to and from a closed position in which they grip the stack of packets 2 inside channel 19.

Device 1 comprises a known control system 25 designed, by means of sensors 26 and 27 through walls 21, to determine maximum and minimum fill conditions respectively of channel 19.

In actual use, under normal operating conditions, store 18 is inoperative and contains at least a given number of packets 2, while wheel 9 feeds packets 2, inside respective seats 10, from station 11, along path 10a through station 17 to station 14. At this phase, pusher 23 is stationary outside wheel 9, and pressure elements 24 are closed so as to grip the packets 2 close to end 22 of channel 19 and keep them a given distance from the packets 2 inside seats 10 on wheel 9.

Store 18 is activated in the event of any gaps occurring in succession 2a, i.e. in the event a packet 2 in any of seats 10 on wheel 9 is rejected, at a reject station 29 along path 10a between input station 11 and reintegrating station 17, by a pusher 30 activated by a control device (not shown). In this case, a sensor 31 for detecting the presence/absence of packets 2 inside seats 10 supplies a signal to control system 25 which, when the empty seat 10 is stopped at station 17, activates pusher 23 so as to move it through the empty seat 10 into engagement with end 22 of channel 19, and bring it substantially into contact with the first packet 2 housed, and retained up to this time by pressure elements 24, inside channel 19. At this point, pressure elements 24, activated by control system 25, are opened, and pusher 23 is moved through seat 10 to enable engagement of the seat by the first packet 2. Upon passage of the first packet 2 being detected by a sensor 32, pressure elements 24 are closed by control system 25 so as to arrest forward feed of the following packets 2 along channel 19. In the event the level of packets 2 inside channel 19 is below that of sensor 27, this detects the absence of a packet 2, and supplies a signal to control system 25 which provides for reintegrating packets 2 inside channel 19.

The reintegrating operation is controlled by two sensors 33 and 34, the first of which is a phase sensor connected to machine 3 for supplying control system 25 with a cycle-start signal for each machine cycle of machine 3, and the second of which is a counter for counting seats 10 in sequences of "n" seats in time with machine 3, i.e. as a function of the phase signal emitted by sensor 33. For performing said reintegrating operation, control system 25, on receiving a cycle-start signal from sensor 33, causes pusher 23 to perform a succession of "n" back and forth movements through a corresponding number of seats 10, i.e. through all the seats 10 in the same sequence of "n" seats, so as to transfer the respective packets 2, if present, into channel 19. Transfer of packets 2 into channel 19 is permitted by corresponding reciprocating movements of pressure elements 24 to and from the closed position as controlled by control system 25 in conjunction with sensor 32.

When store 18 is reloaded, therefore, a "gap" corresponding to non-formation of a group 4 on surface 15 is formed along the supply line of packets 2 to machine 3.

Simultaneously with the start of the reintegrating operation of packets 2 in store 18, control system 25 supplies a stop signal to a device 28 supplying the wrapping material (not shown) for group 4, so as to enable machine 3 to absorb the "gap" with no rejects by performing a complete no-load machine cycle.

Only upon termination of the reintegrating operation of packets 2 in store 18 is the next group 4 of packets 2 formed and supply device 28 reactivated.

We claim:

1. A device (1) for feeding packets (2) of cigarettes to a cartoning machine (3) designed to form the packets (2) into groups of "n" packets (2) each; said device (1) comprising
   conveyor means (9) having a number of seats (10) for feeding a succession (2a) of packets (2) to the cartoning machine (3), said succession (2a) possibly presenting gaps, and each packet (2) being housed inside a respective said seat (10) on the conveyor means (9);
   reintegrating means (18) associated with the conveyor means (9) at an exchange station (17), for feeding the conveyor means (9) with packets (2) with which to reintegrate said gaps;
   said conveyor means (9) comprising a wheel (9) having equally spaced peripheral compartments defining said seats (10); said wheel (9) rotating about its axis for successively feeding said seats (10) through said exchange station (17);
   phase detecting means (33, 34) for dividing the seats (10) of said conveyor means (9) into sequences of "n" seats (10) in time with the cartoning machine (3); and
   transfer means (23) for exchanging said packets (2) between the conveyor means (9) and the reintegrating means (18); said transfer means (23) responding to signals emitted by the phase detecting means (33, 34), for transferring to the reintegrating means (18) all the packets (2) fed by the same said sequence of "n" seats (10), so as to reload the reintegrating means (18) and form, in said succession (2a), a corresponding gap in time with the cartoning machine (3).

2. A device as claimed in claim 1, characterized by the fact that said reintegrating means (18) comprise at least one reintegrating store (18) for receiving a given number of packets (2) and exchanging the packets (2) with said conveyor means (9) at said exchange station (17).

3. A device as claimed in claim 2, characterized by the fact that said reintegrating store (18) is designed to receive a number of said packets (2) at least equal to "n".

4. A device as claimed in claim 1, characterized by the fact that said reintegrating store (18) comprises a channel (19) designed to house a stack of said packets (2); the channel (19) presenting an output end (22) located at said exchange station (17).

5. A device as claimed in claim 4, characterized by the fact that said channel (19) is parallel to said axis of rotation, and said output end (22) is positioned facing the path of said seats (10); said transfers means (23) comprising a pusher (23) movable back and forth in a direction parallel to said axis of rotation, to and from a position wherein it engages said output end (22), and through a said seat (10) at said exchange station (17).

6. A device as claimed in claim 5, characterized by the fact that said reintegrating store (18) comprises releasable clamping means (24) for clamping said packets (2) inside said channel (19).

* * * * *

UNITED STATES PATENT AND TRADEMARK OFFICE
CERTIFICATE OF CORRECTION

PATENT NO. : 5,394,970
DATED : March 7, 1995
INVENTOR(S) : SILVANO BORIANI, ET AL.

It is certified that error appears in the above-indentified patent and that said Letters Patent is hereby corrected as shown below:

On the Title page:

Item     [73] <u>Assignee:</u>

Change "Via Pomponia" to --Bologna--.

Item

[30] <u>Foreign Application Priority Data:</u>

Change "B092A0439 U" to --B092A000439".

Signed and Sealed this

Fifteenth Day of August, 1995

Attest:

BRUCE LEHMAN

*Attesting Officer*      *Commissioner of Patents and Trademarks*